United States Patent
Dick et al.

(10) Patent No.: US 9,624,984 B2
(45) Date of Patent: Apr. 18, 2017

(54) STARTUP CLUTCH LUBRICATION SYSTEM AND METHOD THEREOF

(71) Applicant: ALLISON TRANSMISSION, INC., Indianapolis, IN (US)

(72) Inventors: Elizabeth Dick, Whiteland, IN (US); John Murdock, Fishers, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 161 days.

(21) Appl. No.: 14/597,585

(22) Filed: Jan. 15, 2015

(65) Prior Publication Data

US 2016/0208865 A1    Jul. 21, 2016

(51) Int. Cl.
| | |
|---|---|
| *F16D 13/22* | (2006.01) |
| *F16D 13/74* | (2006.01) |
| *F16D 13/40* | (2006.01) |
| *F16D 13/52* | (2006.01) |
| *F16D 25/0638* | (2006.01) |
| *F16D 25/12* | (2006.01) |
| *F16D 13/68* | (2006.01) |
| *F16D 13/72* | (2006.01) |

(52) U.S. Cl.
CPC ............ *F16D 13/74* (2013.01); *F16D 13/40* (2013.01); *F16D 13/52* (2013.01); *F16D 25/0638* (2013.01); *F16D 25/123* (2013.01); *F16D 13/683* (2013.01); *F16D 13/72* (2013.01); *F16D 2300/0214* (2013.01)

(58) Field of Classification Search
CPC .... F16D 13/74; F16D 25/123; F16D 25/0638; F16D 13/40; F16D 13/52; F16D 13/683; F16D 2300/0214; F16D 13/72
See application file for complete search history.

(56) References Cited

U.S. PATENT DOCUMENTS

| | | | |
|---|---|---|---|
| 4,995,500 A | 2/1991 | Payvar | |
| 6,035,992 A * | 3/2000 | Menard | .................... F16D 13/64 192/107 M |
| 8,408,372 B2 | 4/2013 | Cimatti | |
| 8,684,875 B2 * | 4/2014 | Kaltenbach | ............ B60K 6/365 475/5 |
| 8,821,336 B2 | 9/2014 | Wilton et al. | |
| 8,910,766 B2 | 12/2014 | Kriebernegg et al. | |

(Continued)

FOREIGN PATENT DOCUMENTS

| | | |
|---|---|---|
| JP | 2014173717 A | 9/2014 |
| WO | WO2016115213 A1 | 7/2016 |

OTHER PUBLICATIONS

International Search Report, Apr. 28, 2016, 3 pages.
(Continued)

*Primary Examiner* — David J Hlavka
(74) *Attorney, Agent, or Firm* — Taft Stettinius & Hollister, LLP; Stephen F. Rost

(57) ABSTRACT

A clutch assembly configured to engage and disengage a first shaft from a second shaft includes a controlled and predetermined cooling flow to cool the clutch assembly. The clutch assembly includes a clutch housing, friction plates, and reaction plates optimized to manage fluid flow through the clutch assembly. A plurality of fluid flow outlets is provided to move fluid from an interior of a clutch housing of the clutch assembly to an exterior of the clutch housing.

20 Claims, 7 Drawing Sheets

(56) References Cited

U.S. PATENT DOCUMENTS

| | | | |
|---|---|---|---|
| 2007/0062777 A1 | 3/2007 | Zagrodzki et al. | |
| 2007/0193848 A1* | 8/2007 | Uhler | F16D 13/683 |
| | | | 192/112 |
| 2010/0072020 A1* | 3/2010 | Cimatti | F16D 13/52 |
| | | | 192/113.35 |
| 2011/0000757 A1* | 1/2011 | Muizelaar | F16D 13/683 |
| | | | 192/70.12 |
| 2013/0153355 A1* | 6/2013 | Kummer | F16D 25/0638 |
| | | | 192/48.1 |
| 2014/0131160 A1* | 5/2014 | Tsuda | F16D 13/74 |
| | | | 192/66.3 |
| 2015/0275993 A1* | 10/2015 | Elsesser | F16D 13/72 |
| | | | 188/264 D |

OTHER PUBLICATIONS

Jun Ho, Rhee, "Written Opinion of the International Searching Authority", Apr. 27, 2016, 7 pages.

Aliihsan Karamavruc, Zhiru Shi, and Dave Gunther; "Determination of Empirical Heat Transfer Coefficients via CFD to Predict the Interface Temperature of Continuously Slipping Clutches"; SAE Technical Paper; Published Apr. 12, 2011; 11 pages; DOI 10.4271/2011-01-0313; Published by SAE International.

* cited by examiner

STARTUP CLUTCH LUBRICATION SYSTEM AND METHOD THEREOF

FIELD OF THE DISCLOSURE

The present disclosure relates to a transmission, and in particular, to a startup clutch for use with a multiple speed transmission.

BACKGROUND

Multiple speed transmissions use friction clutches or brakes, planetary gearsets, shafts, and other elements to achieve a plurality of gear or speed ratios. When starting a transmission and changing gears of the transmission, a fluid is moved through a clutch assembly to cool the clutch assembly during startup, and during gear changes of the transmission, and during steady state. Cooling fluid moves from an inlet of the clutch housing, through the interior of the clutch housing, past reaction plates and friction plates, and through an outlet of the clutch housing. Fluid flowing through the clutch housing provides for removal of heat from the clutch through contact with certain components of the clutch, including reaction plates and friction plates by convective cooling.

While fluid flow is known to cool the clutch assembly, the flow of fluid through a clutch assembly is not always sufficient to provide adequate cooling. If fluid flow is too slow in exiting a clutch assembly, the rotating clutch can churn up the oil resulting in oil foaming or increased spin losses. On the other hand, if fluid flow is too high, insufficient cooling of the clutch can occur. Consequently, there is a need for a clutch assembly having an improved fluid flow to provide increased convective cooling capacity.

SUMMARY

In one embodiment of the present disclosure, there is provided a clutch assembly configured to engage and disengage a first shaft from a second shaft. The clutch assembly includes a drive hub configured to be operatively connected to the first shaft, wherein the drive hub includes a plurality of apertures extending from an interior of the drive hub to an exterior of the drive hub. A plurality of friction plates is coupled to the drive hub, wherein each of the friction plates is spaced from an adjacent friction plate by a friction plate space. A plurality of reaction plates are spaced from an adjacent reaction plate by a reaction plate space, wherein each the reaction plate spaces is configured to receive one of the friction plates and each of the friction plate spaces is configured to receive one of the plurality of reaction plates. A blacking plate is disposed adjacent to one of the friction plates and reaction plates. A retaining ring is disposed adjacent to the backing plate and non-adjacent to any one of the plurality of friction plates and plurality of reaction plates. A housing is configured to be operatively connected to the second shaft and is operatively connected to the drive hub and to the plurality of reaction plates. At least one of the housing and the retaining ring includes a plurality of fluid flow outlets disposed adjacent to the backing plate.

In another embodiment of the present disclosure, there is provided a transmission including a transmission housing including a first portion configured to couple to an engine and a second portion configured to couple to a drive shaft. A clutch is disposed between the first portion and the second portion, wherein the clutch includes a clutch housing disposed within the transmission housing and one or more friction plates alternately located with one or more reaction plates, all of which are located within the clutch housing. A backing plate is disposed adjacently to one of the friction plates and reaction plates. A retaining ring is disposed adjacently to the backing plate, wherein at least one of the retaining ring and clutch housing includes a plurality of fluid flow outlets disposed adjacently to the backing plate.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
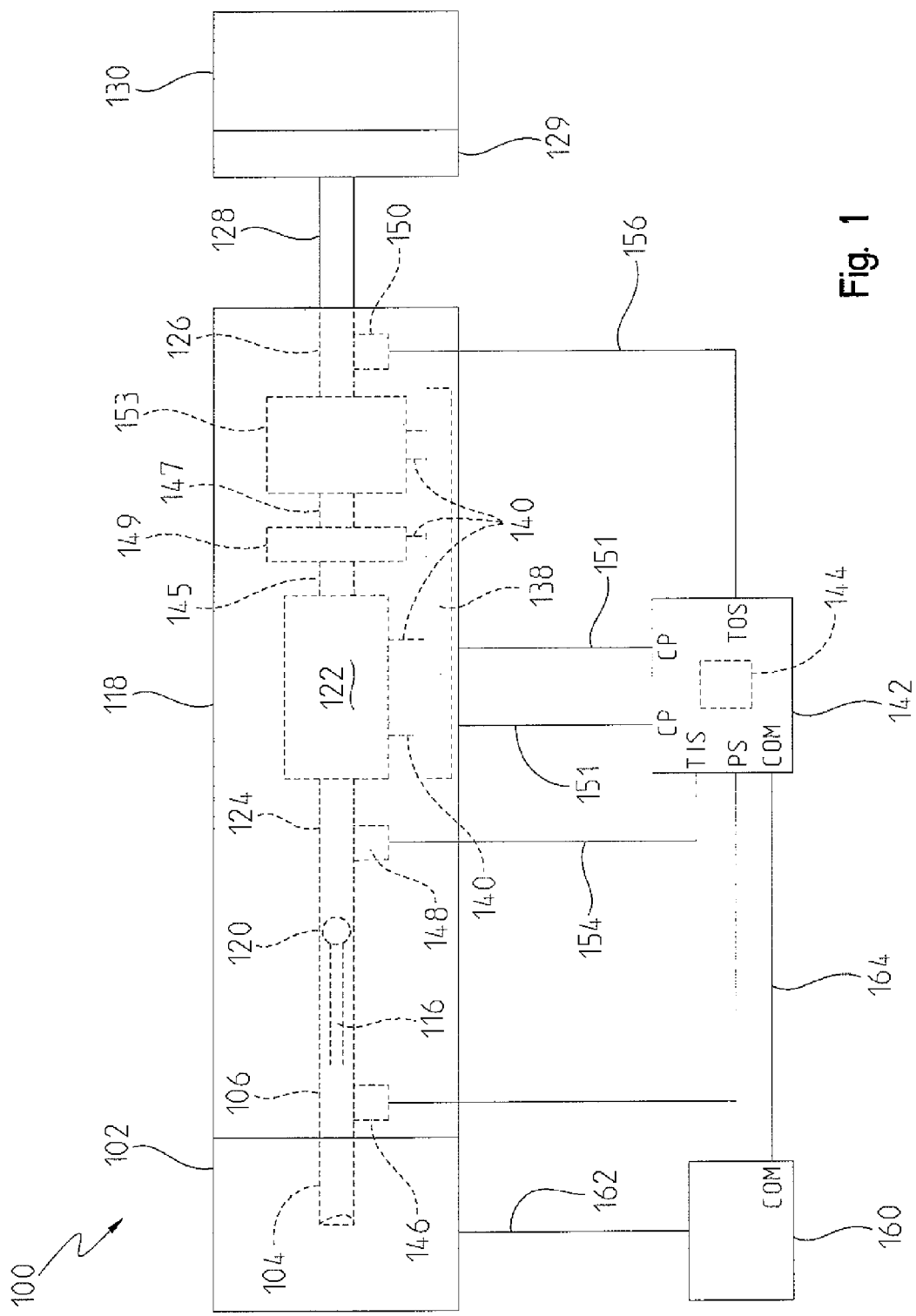
FIG. 1 is a block diagram and schematic view of one illustrative embodiment of a powered vehicular system.

Referring now to FIG. 1, a block diagram one illustrative embodiment of a vehicular system 100 having a drive unit 102 and transmission 118 is shown. In the illustrated embodiment, the drive unit 102 may include an internal combustion engine, diesel engine, electric motor, or other power-generating device. The drive unit 102 is configured to rotatably drive an output shaft 104 that is coupled to an input 106 of the transmission 118. The input 106 is coupled to an impeller or pump that is rotatably driven by the output shaft 104 of the drive unit 102. The transmission 118, in some embodiments, includes an internal pump 120 for building pressure within different flow circuits (e.g., main circuit, lube circuit, etc.) of the transmission 118. The pump 120 is driven by a shaft 116 that is operatively coupled to the output shaft 104 of the drive unit 102. In this arrangement, the drive unit 102 delivers torque to the shaft 116 for driving the pump 120 and building pressure within the different circuits of the transmission 118. In one embodiment, the transmission 118 includes a housing in which the various devices and components illustrated in an outline of transmission 118 are included. In other embodiments, the devices and components within the outline of the housing 118 include one or more separate housings.

The transmission 118, in different embodiments, includes a planetary gear system 122 having a number of automatically selected gears. A rotatable input shaft 124 of the transmission 118 is configured to drive the planetary gear system 122. An output shaft 126 of the transmission 118 is coupled to or integral with and rotatably drives a propeller shaft 128 that is coupled to a pump drive transfer case 129. The pump transfer case 129 is coupled to the propeller shaft 128, which in turn is coupled to a load 130. In one embodiment, the load 130 is a pump.

The transmission 118 further includes an electro-hydraulic system 138 that is fluidly coupled to the planetary gear system 122 via a number of fluid paths 140. The electro-hydraulic system 138 is responsive to control signals to selectively cause fluid to flow through one or more of the fluid paths 140, to thereby control operation, i.e., engagement and disengagement, of a plurality of corresponding friction devices in the planetary gear system 122. The plurality of friction devices may include, but are not limited to, one or more conventional brake devices, one or more torque transmitting devices, and the like. Generally, the operation, i.e., engagement and disengagement, of the plurality of friction devices is controlled by selectively controlling the friction applied by each of the plurality of friction devices, such as by controlling fluid pressure to each of the friction devices. In one embodiment, which is not intended to be limiting in any way, the plurality of friction devices include a plurality of brake and torque transmitting devices in the form of conventional clutches that are each be controllably engaged and disengaged via fluid pressure supplied by the electro-hydraulic system 138. In any case, changing or shifting between the various gears of the transmission 118 is accomplished in a conventional manner by selectively controlling the plurality of friction devices via control of fluid pressure within the number of fluid paths 140.

The system 100 further includes a transmission control circuit 142 which, in different embodiments, includes a memory unit 144. The transmission control circuit 142 is illustratively microprocessor-based, and the memory unit 144 generally includes instructions stored therein that are executable by a processor of the transmission control circuit 142 to control operation of the transmission 118, i.e., including shifting between the various gears of the planetary gear system 122. It will be understood, however, that this disclosure contemplates other embodiments in which the transmission control circuit 142 is not microprocessor-based, but is configured to control operation of the transmission 118, based on one or more sets of hardwired instructions and/or software instructions stored in the memory unit 144.

In the system 100 illustrated in FIG. 1, the transmission 118 includes a number of sensors configured to produce sensor signals that are indicative of one or more operating states of the transmission 118. For example, the input 106 illustratively includes a conventional speed sensor 146 that is positioned and configured to produce a speed signal corresponding to the rotational speed of the input shaft 106, which is the same rotational speed of the output shaft 104 of the drive unit 102. The speed sensor 146 is electrically connected to a pump speed input, PS, of the transmission control circuit 142 via a signal path 152, and the transmission control circuit 142 is operable to process the speed signal produced by the speed sensor 146 in a conventional manner to determine the rotational speed of the pump shaft 106/drive unit output shaft 104.

The speed sensor 148 is electrically connected to a transmission input shaft speed input, TIS, of the transmission control circuit 142 via a signal path 154, and the transmission control circuit 142 is operable to process the speed signal produced by the speed sensor 148 in a conventional manner to determine the rotational speed of the transmission input shaft 124. The transmission includes a speed sensor that determines the rotational speed of the output of a starting clutch 149. The starting clutch 149 is coupled to an output shaft 145 of the planetary gear 122 and to in input shaft 147 of a planetary gear 153.

The transmission 118, in different embodiments, further includes a speed sensor 150 that is positioned and configured to produce a speed signal corresponding to the rotational speed of the output shaft 126 of the transmission 118. The speed sensor 150, in different embodiments, is conventional, and is electrically connected to a transmission output shaft speed input, TOS, of the transmission control circuit 142 via a signal path 156. The transmission control circuit 142 is configured to process the speed signal produced by the speed sensor 150 in a conventional manner to determine the rotational speed of the transmission output shaft 126.

In the illustrated embodiment, the transmission 118 further includes one or more actuators configured to control various operations within the transmission 118. For example, the electro-hydraulic system 138 described herein illustratively includes a number of actuators, e.g., conventional solenoids or other conventional actuators, that are electrically connected to a one or more control outputs CP of the transmission control circuit 142 via a corresponding number of signal paths 151. The actuators within the electro-hydraulic system 138 are each responsive to a corresponding one of the control signals CP, produced by the transmission control circuit 142 on one of the corresponding signal paths 151 to control the friction applied by each of the plurality of friction devices by controlling the pressure of fluid within one or more corresponding fluid passageway 140, and thus control the operation, i.e., engaging and disengaging, of one or more corresponding friction devices, based on information provided by the various speed sensors 146, 148, and/or 150.

The friction devices of the planetary gear system 122 and the planetary gear system 153, disposed between the clutch 149 and the propeller shaft 128, are illustratively controlled by hydraulic fluid which is distributed by the electro-hydraulic system 138 in a conventional manner. For example, the electro-hydraulic system 138 illustratively includes a conventional hydraulic positive displacement pump (not shown) which distributes fluid to the one or more friction devices via control of the one or more actuators within the electro-hydraulic system 138. In this embodiment, the control signals CP are illustratively analog friction device pressure commands to which the one or more actuators are responsive to control the hydraulic pressure to the one or more frictions devices. It will be understood, however, that the friction applied by each of the plurality of friction devices may alternatively be controlled in accordance with other conventional friction device control structures and techniques, and such other conventional friction device control structures and techniques are contemplated by this disclosure. In any case, however, the analog operation of each of the friction devices is controlled by the control circuit 142 in accordance with instructions stored in the memory unit 144.

As further illustrated in FIG. 1, the system 100 includes a drive unit control circuit 160 having an input/output port (I/O) that is electrically coupled to the drive unit 102 via a number of signal paths 162, one of which is illustrated. The drive unit control circuit 160, in different embodiments is conventional, and is operable to control and manage the overall operation of the drive unit 102. The drive unit control circuit 160 further includes a communication port, COM, which is electrically connected to a similar communication port, COM, of the transmission control circuit 142 via a number of signal paths 164, one of which is illustrated. The one or more signal paths 164 are typically referred to collectively as a data link. Generally, the drive unit control circuit 160 and the transmission control circuit 142 are operable to share information via the one or more signal paths 164 in a conventional manner. In one embodiment, for example, the drive unit control circuit 160 and transmission control circuit 142 are operable to share information via the one or more signal paths 164 in the form of one or more messages in accordance with a society of automotive engineers (SAE) J-1939 communications protocol, although this disclosure contemplates other embodiments in which the drive unit control circuit 160 and the transmission control circuit 142 are operable to share information via the one or more signal paths 164 in accordance with one or more other conventional communication protocols (e.g., from a conventional databus such as J1587 data bus, J1939 data bus, IESCAN data bus, GMLAN, Mercedes PT-CAN).

Figure 2:
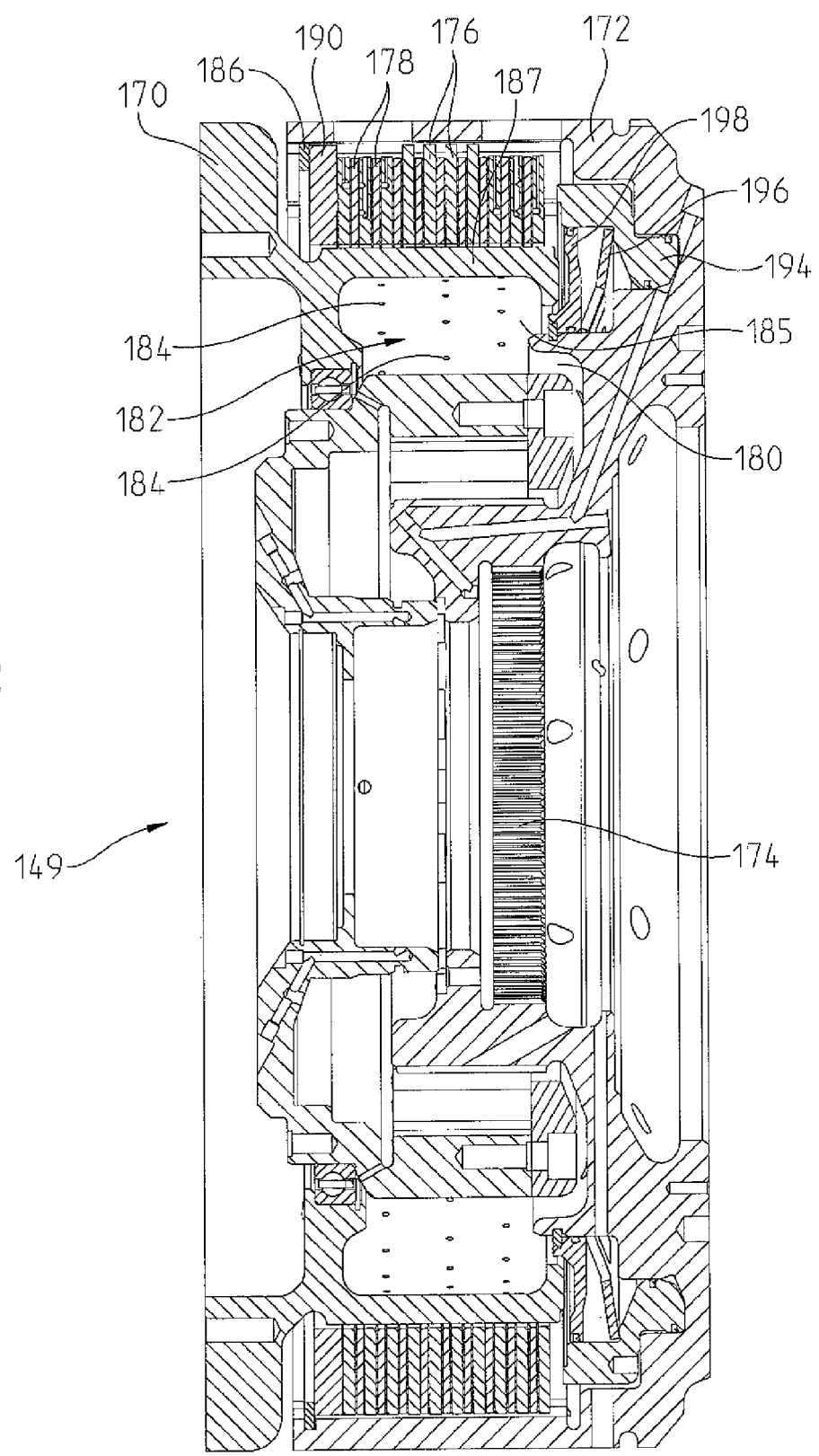
FIG. 2 is a section view of a clutch.

FIG. 2 is a sectional view of the clutch 149 coupled including a clutch drive hub 170 coupled to the output shaft 145 of the planetary gear 122. A housing 172 is operatively connected to the clutch drive hub 170 and rotates in response to rotation of the output shaft 145. The housing 172 includes a threaded portion 174 configured to be operatively coupled to the input shaft 147 of the planetary gear 153. The clutch 149 is a wet clutch, since the location of the clutch is within the housing of the transmission 118 through which fluid flows.

The clutch 149 is configured to improve contact between a lubricating fluid, such as oil, which moves through the clutch 149 and past a plurality of reaction plates 176 and a plurality of friction plates 178. An oil inlet 180 is operatively coupled to the electrohydraulic system 138 and directs a flow of lubricating fluid to an interior space 182 defined by the drive hub 170. The drive hub 170 includes a plurality of through holes or apertures 184 disposed on an interior surface 185 of the drive hub 170, each of which directs oil from the oil inlet 180, through the interior space 182 and to an exterior space or outside location of the drive hub 170. The apertures extend through a hub wall 187. The cooling fluid then moves into contact with the reaction plates 176 and the friction plates 178 and, in particular, between the spaces defined between the reaction plates 176 and friction plates 178 which are enhanced by a flow pattern defined in the reaction plates 178 to increase the convective cooling capacity.

A retaining ring 186 engages a slot 188 (see FIG. 3) of the housing 172. The retaining ring 186 provides a reaction for the clutch when the clutch is applied by a piston 198. In addition, a backing plate 190 is disposed adjacently to the retaining ring 186 between the retaining ring 186 and one of the reaction plates 176. The retaining ring 186 and the backing plate 190 each both generally define a circle which is centered about the axis of rotation of the output shaft 145 or the housing 172 when assembled in the clutch 149.

The reaction plates 176 and friction plates 178 are alternately located along an outside surface 192 (see FIG. 3) of the drive hub 170 and engage at interfaces between adjacent reaction plates 176 and friction plates 178 upon movement of a piston 194, as is understood by those skilled in the art. A return spring 196 is disposed adjacently to the piston 194 and a balance piston 198. The balance piston 198 is located next to the drive hub 170 and is configured to entrap cooling fluid between the piston 198 and the piston 194 to balance movement of the piston 194 against any backfill pressure which can occur behind the piston 194.

Figure 3:
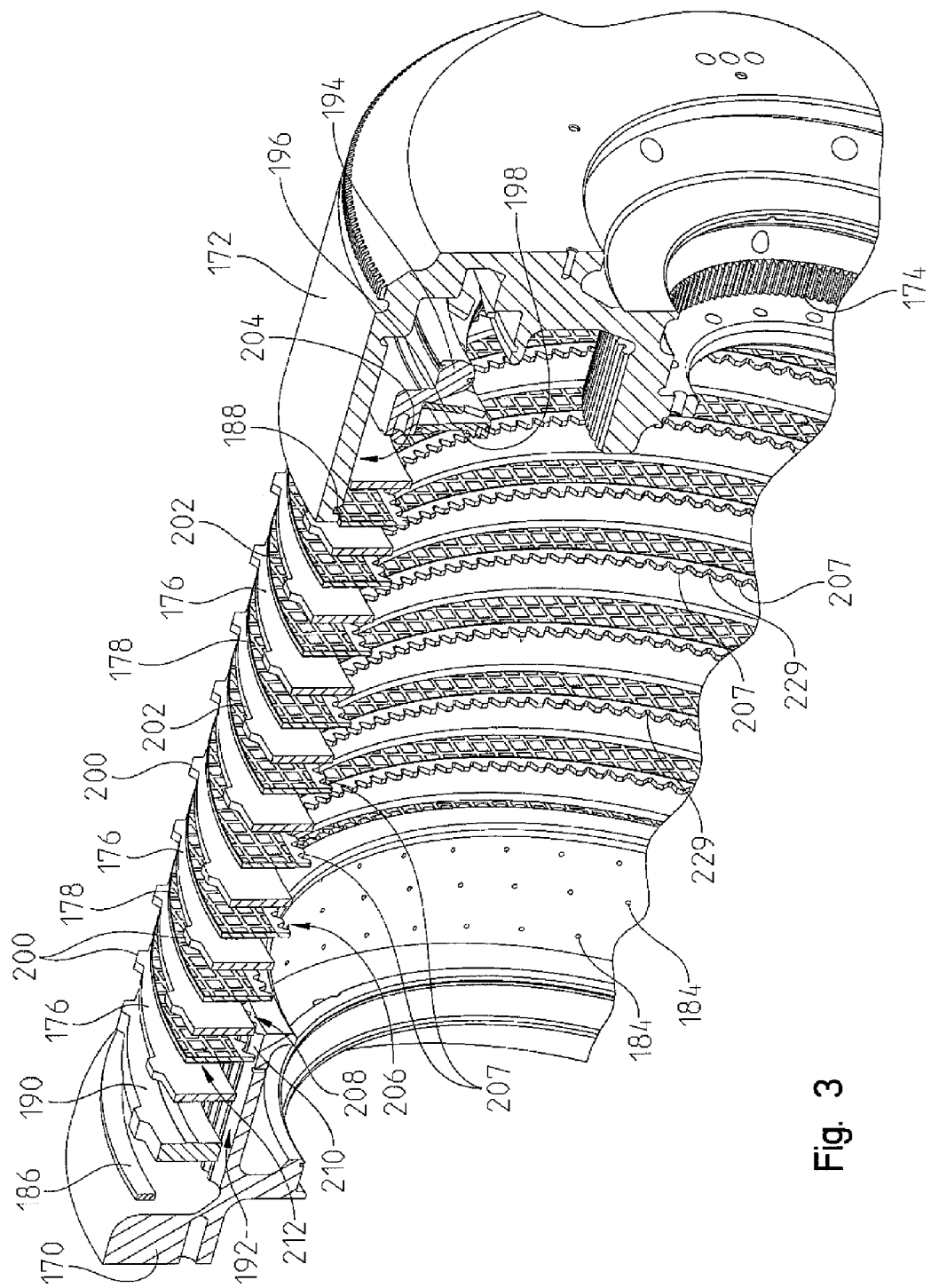
FIG. 3 is a partial perspective exploded view of a clutch.

FIG. 3 further illustrates the clutch 149 in a partial perspective exploded view. As seen in FIG. 3, each of the reaction plates 176 include spaced splines 200 disposed around a circumference of the reaction plates which are configured to engage corresponding apertures, slots, or channels in the housing 172. A non-splined portion 202 of the outer circumference of the reaction plate 176 is disposed adjacently to an inner surface 204 of the housing 172. The interface between the non-splined portion 202 and inner surface 204, in some embodiments, is not fluid tight and provides a flow path for the cooling fluid from the oil inlet 180, through the apertures 184 and past the reaction plates 176 and friction plates 178. Fluid flow, does however, occur at any gap between parts sufficiently sized to enable fluid flow.

Each of the friction plates 178 include spaced splines 206. The drive hub 170 includes a plurality of troughs or valleys 208, alternately disposed between ridges 210, both of which are located at an outer circumference of the drive hub 170. The spaced splines 206 include portions 207 configured to engage the valleys 208. Consequently, cooling fluid flow is directed from the inlet 180, through the interior space 182, through the apertures 184, and past the surfaces of the reaction plates 176 and the friction plates 178. To insure that the flow rate along these paths is controlled to a desired flow rate, each of the opposed sides 212 of the reaction plates 176, one of the two sides being illustrated, includes a flow pattern having the appearance of a waffle pattern including raised height portions 214 delimited by reduced height portions 216. See also FIG. 7. The reduced height portions 216 direct a flow of cooling fluid along the reduced height portions 214, which act as a fluid flow channel.

Figure 4:
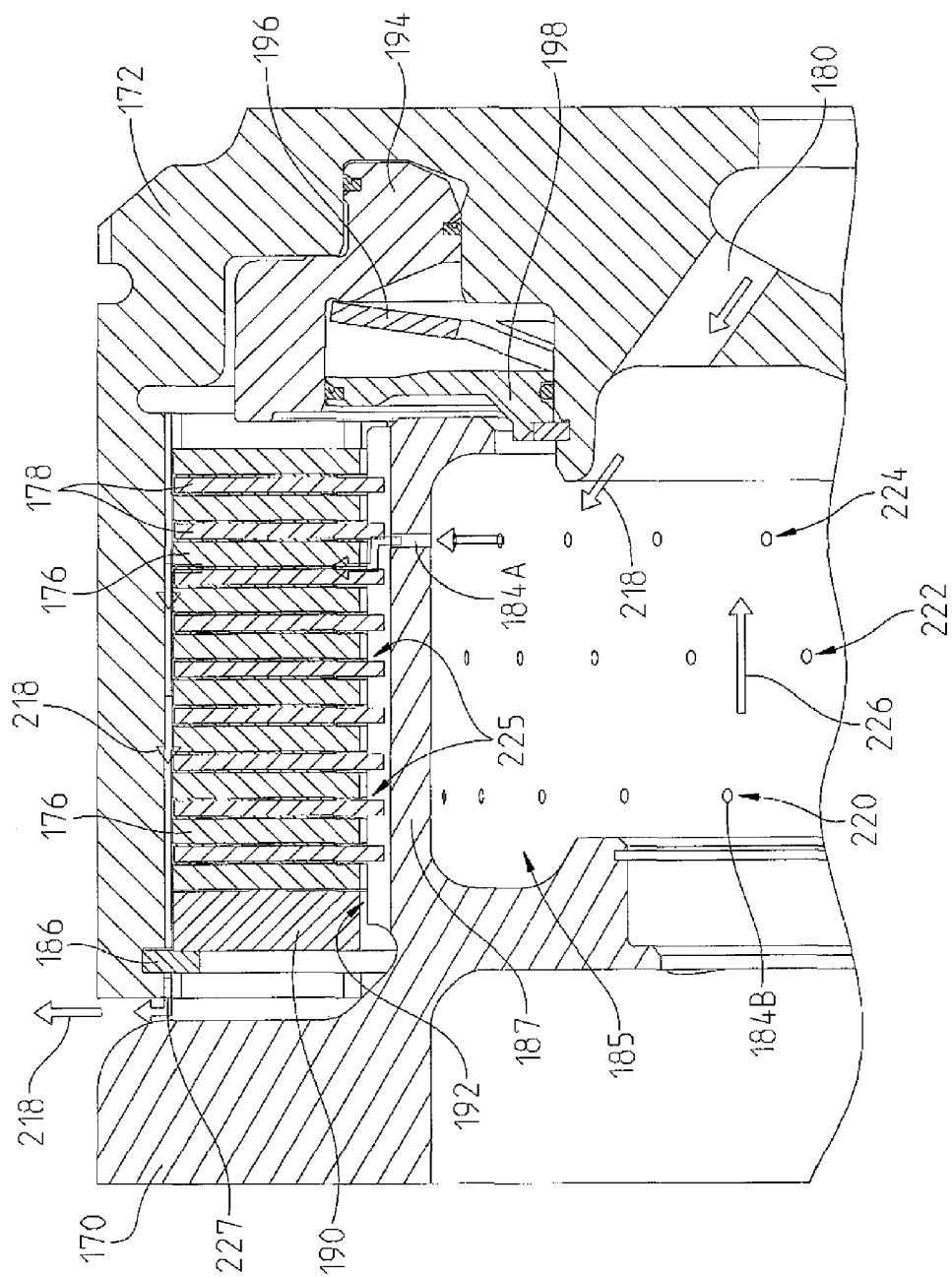
FIG. 4 is a partial sectional view of a portion of a clutch including a flow path for a fluid moving into, within, and out of a housing of the clutch.

As illustrated in a partial sectional view of a portion of a clutch 149 of FIG. 4, a flow path 218 is defined by the inlet 180, through the apertures 184, along the interfaces between adjacent reaction plates 176 and friction plates 178, along the interface between the inner surface 204 of the housing 172 and the outer circumferences of the reaction plates 176 and the friction plates 178. The flow path 218 is one of many flow paths and is illustrative of one flow path through the clutch 149.

To provide for the flow of cooling fluid from the interior space 182, the apertures 184 are located in a defined pattern along the interior surface 185 of the hub 170. The defined pattern includes a plurality of rows of apertures, wherein the apertures in each row of apertures is symmetrically spaced along the interior surface 185. In one embodiment, the hub 170 includes a first row of apertures 220, a second row of apertures 222, and a third row of apertures 224. As can be seen in FIG. 4, one of the apertures 184A is shown in cross-section to illustrate that each of the plurality of apertures 184 extends through the hub wall 187. In one embodiment, each of the plurality apertures 184 includes a three millimeter diameter hole or orifice. In other embodiments, the diameter of the apertures 184 is a different size.

As farther illustrated in FIG. 4, each of the rows of apertures is substantially located along the radius extending from an axis of rotation of the hub 170, to an interface 225 between one of the reaction plates 176 and one of the friction plates 178. In one embodiment, each of the rows 220, 222, and 224 of apertures 184 is not aligned with a radius extending to the splines 206, but is instead offset from the splines 206. In another embodiment, the apertures 184 are aligned with a root 229 (see FIG. 3) of the portions 207 such that fluid flow is enabled between the friction plates 178 and the outer periphery of the hub 170. Additionally in one embodiment as illustrated, each one of the rows 220, 222, and 224 of the apertures 184 is spaced from another row of apertures by a distance of greater than the distance between two of the friction plates 178. So for instance, the distance between the second row of apertures 222 and the third row of apertures 224 is greater than or equal to the distance between two consecutively located friction plates 178. The distance between the first row of apertures 220 and the second row of apertures 222 is a distance of three consecutively located friction plates 178. In this way, flow rate of cooling fluid from the inlet 180 to an exterior of the housing 172 is controlled to convectively cool the clutch 149.

Each of the rows of apertures is staggered with respect to at least one other row of apertures such that the apertures 184 in one of the rows is not aligned with the apertures of one or more of the other rows, if determined along lines extending longitudinally along line along the surface 185 substantially parallel to the axis of rotation of the housing 170. For instance, the aperture 184B is the only aperture of any row which is aligned along the line 226.

The spacing between the rows of apertures determines the amount of oil flow from the interior space 182 through the holes 184, into the gaps between reaction plates 176 and the friction plates 178, past the backing plate 190, and to the exterior of the housing 172. In this configuration, the oil flow through the clutch is relatively evenly distributed from the interior space 182. Additionally, the row of apertures 220 is longitudinally spaced from the backing plate 190 to insure that excess oil does not flow past the backing plate 190, which potentially starves the rest of the clutch from the flow of oil. In one embodiment, the distance between the rows of apertures 184 is no greater than the distance between three of the friction plates.

The fluid flow path 218 extends from the oil inlet 180 through the interior space 182, through the apertures 184, along the exterior surface of the hub 192, between the reaction plates 176 and friction plates 178, along the outer periphery of these plates and the backing plate 190, past the retaining ring 186, through an exit point 227 and into the transmission housing since this is a wet clutch. While only one fluid flow path 218 is illustrated, each of the apertures 184 provides similar flow paths for the cooling fluid such that the cooling fluid exits the clutch at a location adjacent to the retaining ring 186. By configuring the exit point 227 to be located at one end of the alternating reaction plates 176 and friction plates 178, the cooling fluid or oil is forced to flow along the internal splines of both the reaction plates 176 and friction plates 178 to provide improved cooling of the clutch 149.

As described above, at least one component of the flow control mechanism, the inner diameter of the hub 170, which is defined by the interior space 182, includes a specific pattern of apertures 184 and sizing of the individual apertures 184. Since the interior space 182 inside the hub 170 is the entry location for all of the fluid (which acts as a lubricant and coolant) which is directed to the critical components of the clutch, the sizing, spacing, and patterns of the apertures is determined. Such considerations include sufficient fluid flow, distributed fluid flow, and limited air entrainment within the clutch. In large clutches, the considerations of fluid flow and air entrainment are driven primarily by the centrifugal load, the density of the oil, and axial length of the clutch pack.

In a first consideration, placement of the holes is determined to ensure that all clutch plates receive a required fluid mass flow rate, and that escape of the fluid behind the backing plate 190 is limited, as this carries no heat and provides no lubrication. The pattern displayed is a very efficient pattern in that it provides both an axial and circumferential even distribution of oil.

Sizing of holes is critical to ensure that an overly large head of oil does not develop, thereby starving the clutch plates, and that air is not entrained and introduced to the clutch pack, which includes the reaction plates 176 and the fiction plates 178. If this were to occur in large amounts, the bulk cooling properties of the fluid would be compromised. By taking into account the centrifugal load, desired mass flow rate, and density of the fluid, it is possible to develop an equivalent aperture size, where all apertures are generally of the same size, for all paths from inner clutch hub to clutch pack. Sizing of apertures is then determined based on distributing this equivalent orifice sizing per the above stated need to distribute oil evenly.

When balancing the requirements of the sizing of holes and the spacing of holes, the manufacturing feasibility and cost restrictions are considered. While the placement of many small holes evenly over the interior surface of the hub 170 could potentially achieve a desired result, it is not feasible to drill apertures on a curved surface below a certain size. Consequently, a balance between a maximum number of apertures and a minimum aperture size is determined meet the equivalent orifice size needs while still being manufacturable provides such a balance. Consequently, in one embodiment as described herein, each of the plurality apertures 184 includes a three millimeter diameter hole or orifice. Additionally, the first row of apertures 220 is spaced from the backing plate 190 by at least two of the friction plates 178.

Figure 5:
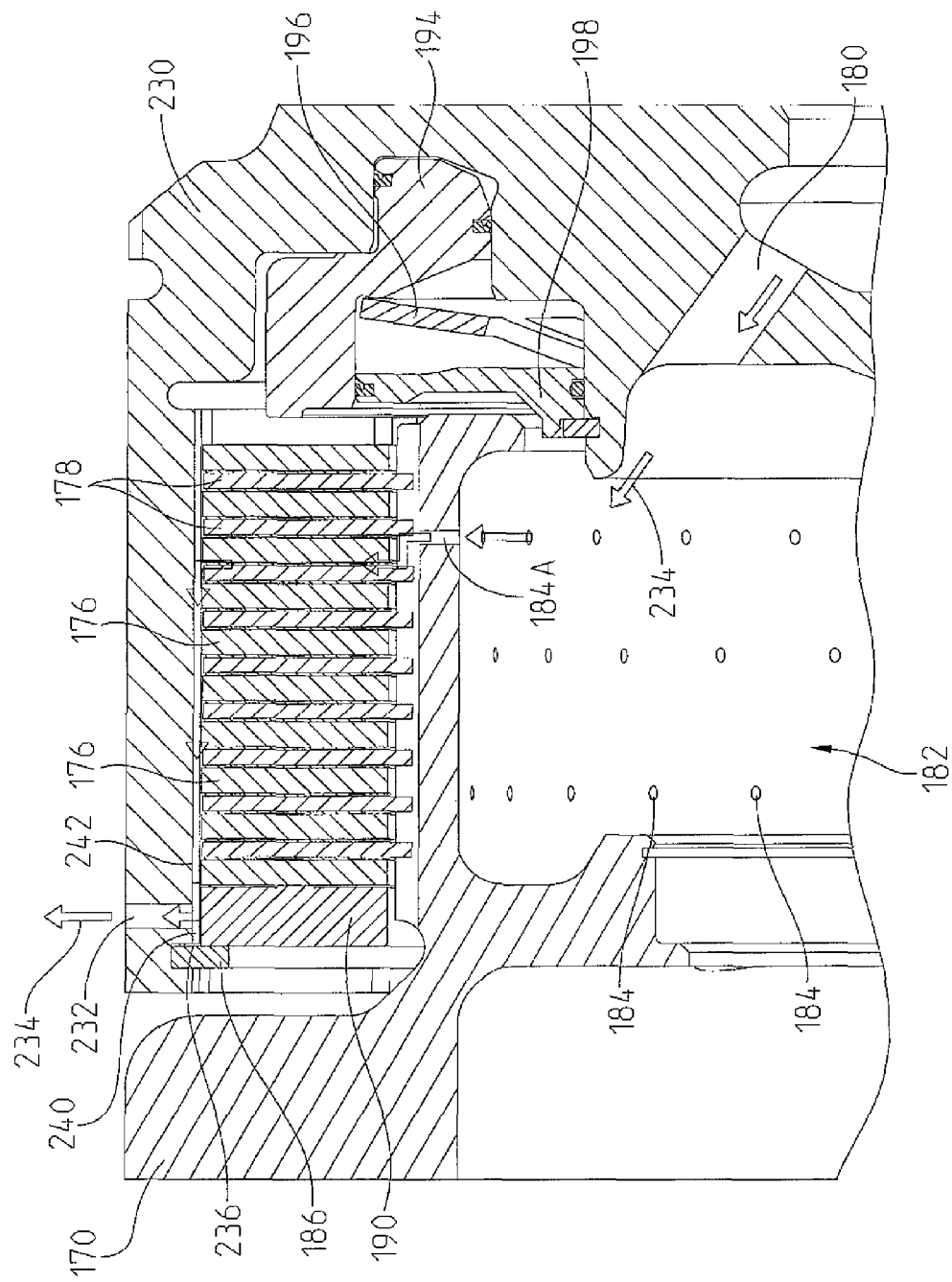
FIG. 5 is a partial sectional view of a portion of another embodiment of a clutch including another flow path for a fluid moving into, within, and out of a housing of the clutch.
Figure 6:
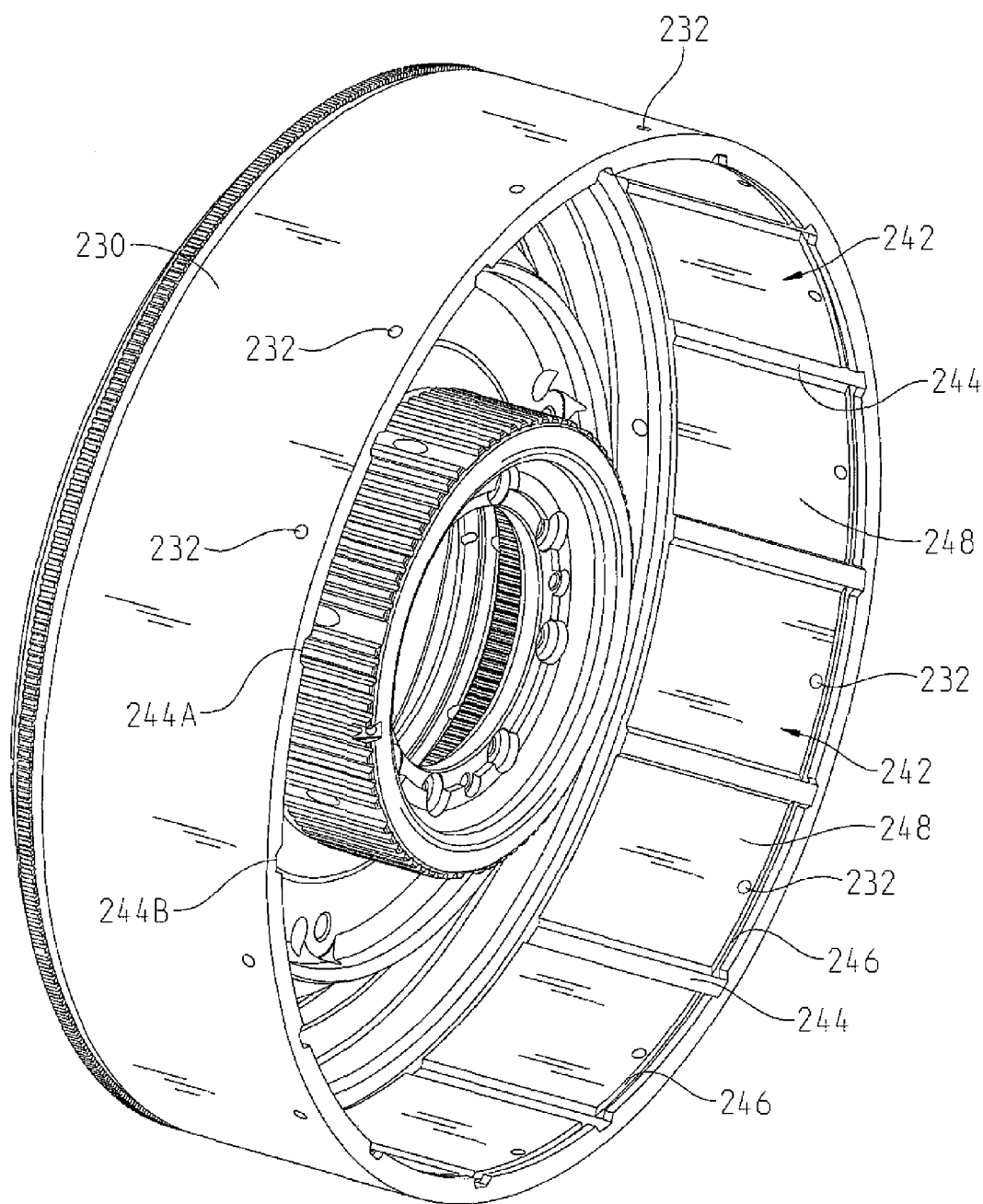
FIG. 6 is a perspective view of an outside of a housing of the clutch.

FIG. 5 illustrates another embodiment of the clutch 149 including a housing 230 having a plurality of apertures 232, as further illustrated in FIG. 6. As seen in FIG. 5, the component parts of the clutch 149 are substantially the same as those illustrated in FIG. 4. In FIG. 5, however, a flow path 234 is defined by the plurality of apertures 232, each of which provides an exit point for the flow of fluid from the housing 230. The flow path 234 extends from the oil inlet 180, through the interior space 182, through the apertures 184, and along the reaction plates 176 and friction plates 178. In this embodiment, however, the flow of cooling fluid does not flow past the backing plate 190 and the retaining ring 186 as previously described, but instead flows through the plurality of apertures 232 and into the transmission housing. Each of the apertures 232 is disposed adjacent to the retaining ring 186 and the backing plate 190 such that a portion of the flow path 234 is defined by a wall 236 of the retaining ring 186, an outer circumferential surface 240 of the backing plate 190, and an inner surface 242 of the housing 230.

In the embodiment of FIG. 5, the retaining ring 186 is configured to fit more tightly in the slot 188, than the retaining ring 186 as illustrated in FIG. 4. In FIG. 4, while fluid flow occurs past the retaining ring 186 and along the path 218, in FIG. 5, the retaining ring 186 is configured to provide a substantially fluid tight seal with the housing 230. Consequently, the fluid moves out of each of the apertures 232 along the multiple flow paths 234. In this configuration, the flow of fluid is more precisely configurable and controllable to achieve the fluid mass flow rate based on centrifugal load and density of fluid.

As illustrated in FIG. 6, the inner surface 242 of the housing includes a plurality of channels 244 which extend along the axis of rotation of the hub 170. Each of the channels 244 is configured to receive splines 200 of the reaction plates 176. While not shown, the housing 172 of FIG. 3 includes these channels as well. In the illustrated embodiment of FIG. 6, fifteen channels are spaced substantially equidistantly about the inner surface 242, which generally defines a cylinder. The housing 230, in the illustrated embodiment includes fourteen apertures 232, each of which are arranged adjacently to a channel 246 configured to receive the retaining ring 186. Each of the fourteen apertures 232 is also centrally located between adjacent channels 244, in an in-spline space 248. In the illustrated embodiment, the housing 230 does not include an aperture 232 between the channels 244A and 244B, although in other embodiments an aperture 232 is included between the channels 244A and 244B. Each of the apertures 232 are generally evenly distributed about the radius of the hub. Consequently, the illustrated embodiment includes fifteen in-spline spaces 248 and fourteen apertures 232, or one less aperture than the number of in-spline spaces. In one embodiment, the apertures 232 are substantially cylindrical and include a diameter of about eight (8) millimeters.

Figure 7:
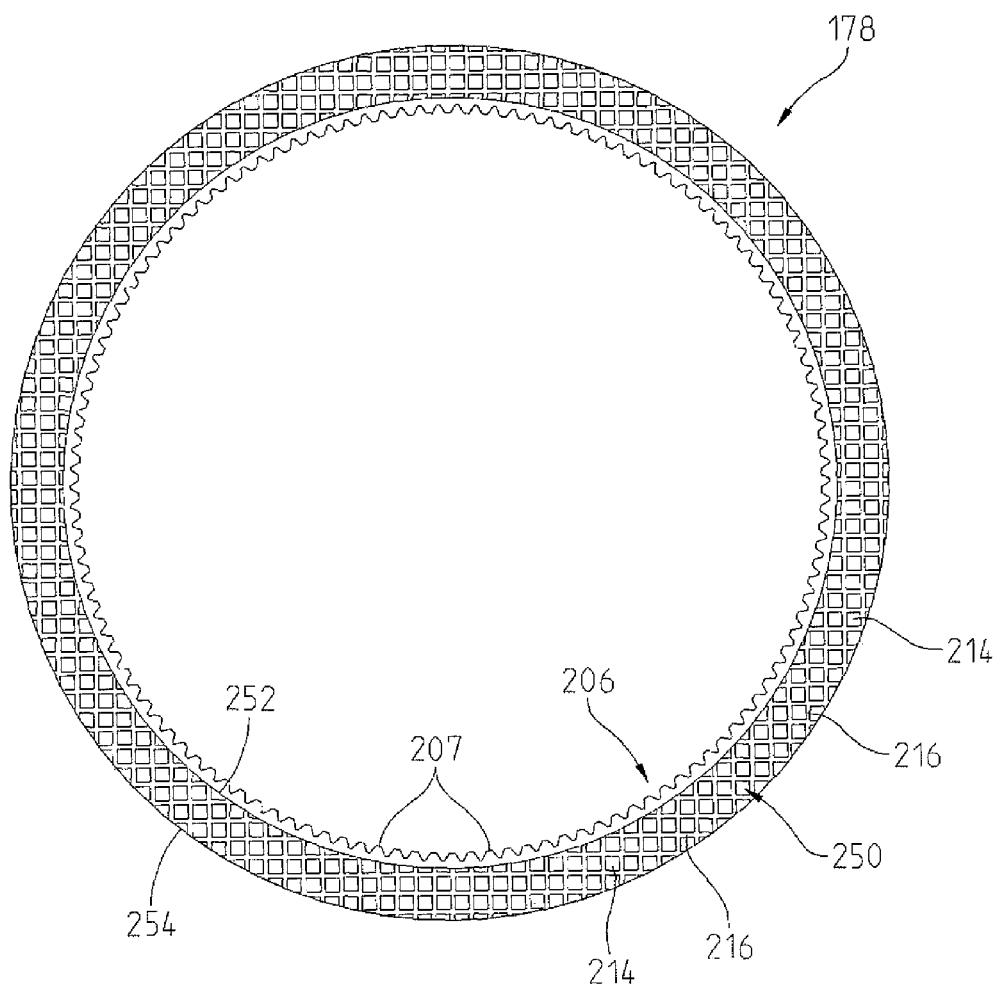
FIG. 7 is a plan view of a friction plate including a groove pattern.

FIG. 7 is a plan view of one of the friction plates 178 including a groove pattern 250. The groove pattern 250 is disposed on both sides 212 of the friction plate 178 and is configured to direct cooling fluid flow from an interior circumference 252 to an exterior circumference 254 of the plate 178. The groove pattern 250 includes the raised height portions 214 delimited by the reduced height portions 216. The reduced height portions 216 define channels with the raised height portions 214. In one embodiment, the width of the reduced height portions 216 is about 3.2 millimeters and the raised height portions 214, which are generally square, have a width/height of about 12.8 millimeters.

In these and other embodiments incorporating the teachings of the present disclosure, the configuration of the inlet apertures 184 and outlet apertures 234 as well as the clutch groove pattern 250 is optimized to reduce the flow of the cooling fluid through the clutch. Slowing down the flow (speed) of cooling fluid allows the cooling fluid to contact the plates 176, 178 to provide increased convective cooling capacity. The number and arrangement of apertures 184 and 234 is also optimized to provide increased cooling capacity.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A clutch assembly configured to engage and disengage a first shaft from a second shaft comprising:
   a drive hub configured to be operatively connected to the first shaft, the drive hub including a plurality of apertures extending from an interior of the drive hub to an exterior of the drive hub;
   a plurality of friction plates coupled to the drive hub, wherein each of the friction plates is spaced from an adjacent friction plate by a friction plate space;
   a plurality of reaction plates, wherein each of the reaction plates are spaced from an adjacent reaction plate by a reaction plate space, wherein each the reaction plate spaces is configured to receive one of the friction plates and each of the friction plate spaces is configured to receive one of the plurality of reaction plates;
   a backing plate, wherein the backing plate is disposed adjacent to one of the friction plates and reaction plates;
   a retaining ring disposed adjacent to the backing plate and non-adjacent to any one of the plurality of friction plates and plurality of reaction plates;
   a housing including an inner surface and configured to be operatively connected to the second shaft and which is operatively connected to the drive hub and to the plurality of reaction plates, wherein at least one of the housing and the retaining ring includes a plurality of fluid flow outlets disposed adjacent to the backing plate; and
   a plurality of fluid flow paths configured to provide fluid flow to the fluid flow outlets, the plurality of fluid flow paths defined at an interface located at the inner surface of the housing and the reaction plates and at an interface located at the inner surface of the housing and the friction plates.

2. The clutch assembly of claim 1 wherein each of the plurality of fluid flow outlets is aligned with one of the plurality of fluid flow paths.

3. The clutch assembly of claim 2 wherein the fluid flow paths are defined by splines of the reaction plates.

4. The clutch assembly of claim 3 wherein each of the fluid flow outlets is aligned along a single radius defined by the housing.

5. The clutch assembly of claim 4 wherein each of the fluid flow outlets includes an aperture extending through one of the retaining ring and the housing.

6. The clutch assembly of claim 5 wherein each of the apertures extends through the housing and each is are aligned along an exterior of the housing generally aligned with the backing plate.

7. The clutch assembly of claim 6 wherein each of the apertures extending through the housing is aligned along an exterior of the housing generally aligned with a radius of the backing plate.

8. The clutch assembly of claim 7 wherein the drive hub includes a plurality of splines and a plurality of spline spaces and each of the plurality of housing apertures is located opposite one of the plurality of spline spaces.

9. The clutch assembly of claim 8 wherein splines of the reaction plates engage openings of the housing and a space between splines of the reaction plates define a gap with the housing, wherein the gaps define the fluid flow paths.

10. A clutch assembly configured to engage and disengage a first shaft from a second shaft comprising:
    a drive hub configured to be operatively connected to the first shaft, the drive hub including a plurality of apertures extending from an interior of the drive hub to an exterior of the drive hub;
    a plurality of friction plates coupled to the drive hub, wherein each of the friction plates is spaced from an adjacent friction plate by a friction plate space;
    a plurality of reaction plates, wherein each of the reaction plates are spaced from an adjacent reaction plate by a reaction plate space, wherein each the reaction plate spaces is configured to receive one of the friction plates and each of the friction plate spaces is configured to receive one of the plurality of reaction plates;
    a backing plate, wherein the backing plate is disposed adjacent to one of the friction plates and reaction plates;
    a retaining ring disposed adjacent to the backing plate and non-adjacent to any one of the plurality of friction plates and plurality of reaction plates;
    a housing configured to be operatively connected to the second shaft and which is operatively connected to the drive hub and to the plurality of reaction plates, wherein at least one of the housing and the retaining ring includes a plurality of fluid flow outlets disposed adjacent to the backing plate;

a plurality of fluid flow paths defined between the housing and the reaction plates and the housing and the friction plates, wherein each of the plurality of fluid flow outlets is aligned with one of the plurality of fluid flow paths;

wherein the fluid flow paths are defined by splines of the reaction plates and are configured to provide fluid flow to the fluid flow outlets;

wherein each of the fluid flow outlets is aligned along a single radius defined by the housing;

wherein each of the fluid flow outlets includes an aperture extending through one of the retaining ring and the housing; and wherein each of the apertures extends through the retaining ring and each one of the apertures is associated with one of the fluid flow paths.

11. A transmission including a transmission housing, the transmission comprising:
   a first portion configured to couple to an engine,
   a second portion configured to couple to a drive shaft, and
   a clutch disposed between the first portion and the second portion, wherein the clutch includes a clutch housing having an inner surface and disposed within the transmission housing, one or more friction plates and one or more reaction plates, all of which are located within the clutch housing, a backing plate disposed adjacently to one of the friction plates and reaction plates, and a retaining ring disposed adjacently to the backing plate, wherein at least one of the retaining ring and clutch housing includes a plurality of fluid flow outlets disposed adjacently to the backing plate, and wherein each of the one or more friction plates is located adjacently to one of the one or more reaction plates; and
   a plurality of fluid flow paths configured to provide fluid flow to the fluid flow outlets, the plurality of fluid flow paths defined at an interface located at the inner surface of the housing and the reaction plates and at an interface located at the inner surface of the housing and the friction plates.

12. The transmission of claim 11 wherein each of the plurality of fluid flow outlets is aligned with one of the plurality of fluid flow paths.

13. The transmission of claim 12 wherein the plurality of fluid flow paths is defined by splines of the reaction plates.

14. The transmission of claim 13 wherein each of the plurality of fluid flow outlets is aligned along a single radius defined by the clutch housing.

15. The transmission of claim 14 wherein each of the plurality of fluid flow outlets includes an aperture extending through one of the retaining ring and the clutch housing.

16. The transmission of claim 15 wherein each of the apertures extends through the clutch housing and is aligned along an exterior of the housing generally aligned with the backing plate.

17. The transmission of claim 16 wherein each of the apertures extending through the clutch housing is aligned along an exterior of the housing generally aligned with a radius of the backing plate.

18. The transmission of claim 17 wherein the drive hub includes a plurality of splines and a plurality of spline spaces and each of the plurality of clutch housing apertures is located opposite one of the plurality of spline spaces.

19. The transmission of claim 18 wherein splines of the reaction plates engage openings of the clutch housing and a space between splines of the reaction plates define a gap with the clutch housing, wherein the gaps define the fluid flow paths.

20. A transmission including a transmission housing, the transmission comprising:
   a first portion configured to couple to an engine;
   a second portion configured to couple to a drive shaft;
   a clutch disposed between the first portion and the second portion, wherein the clutch includes a clutch housing disposed within the transmission housing, one or more friction plates and one or more reaction plates, all of which are located within the clutch housing, a backing plate disposed adjacently to one of the friction plates and reaction plates, and a retaining ring disposed adjacently to the backing plate, wherein at least one of the retaining ring and clutch housing includes a plurality of fluid flow outlets disposed adjacently to the backing plate, and wherein each of the one or more friction plates is located adjacently to one of the one or more reaction plates;
   a plurality of fluid flow paths defined between the clutch housing and the reaction plates and the clutch housing and the friction plates, wherein each of the plurality of fluid flow outlets is aligned with one of the plurality of fluid flow paths;
   wherein the plurality of fluid flow paths is defined by splines of the reaction plates and are configured to provide fluid flow to the fluid flow outlets;
   wherein each of the plurality of fluid flow outlets is aligned along a single radius defined by the clutch housing;
   wherein each of the plurality of fluid flow outlets includes an aperture extending through one of the retaining ring and the clutch housing; and
   wherein each of the apertures extends through the retaining ring and each one of the apertures is associated with one of the fluid flow paths.

* * * * *